United States Patent
Numata et al.

(10) Patent No.: US 10,159,234 B2
(45) Date of Patent: Dec. 25, 2018

(54) FISHING REEL

(71) Applicant: Shimano Inc., Sakai, Osaka (JP)

(72) Inventors: Fumihide Numata, Sakai (JP); Norikazu Taki, Sakai (JP); Yuichiro Ishikawa, Sakai (JP); Akira Niitsuma, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 210 days.

(21) Appl. No.: 15/374,593

(22) Filed: Dec. 9, 2016

(65) Prior Publication Data

US 2017/0208788 A1 Jul. 27, 2017

(30) Foreign Application Priority Data

Jan. 22, 2016 (JP) .................................. 2016-010628

(51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC ........ A01K 89/01555; A01K 89/01931; A01K 89/045
See application file for complete search history.

(56) References Cited

U.S. PATENT DOCUMENTS

| | | | | |
|---|---|---|---|---|
| 2,214,617 A | * | 9/1940 | Kenyon | B21B 37/54 242/412.1 |
| 2,715,701 A | * | 8/1955 | Moore | B21B 37/50 264/40.7 |
| 5,032,858 A | * | 7/1991 | Kobayashi | G02B 7/102 396/284 |
| 5,235,378 A | * | 8/1993 | Tominaga | G03B 7/16 396/205 |
| 2010/0038156 A1 | * | 2/2010 | Fujitake | B60K 6/445 180/65.22 |
| 2016/0102644 A1 | * | 4/2016 | Ouchi | H02P 27/085 290/31 |

FOREIGN PATENT DOCUMENTS

JP 2004208630 A 7/2004

* cited by examiner

*Primary Examiner* — Emmanuel M Marcelo
(74) *Attorney, Agent, or Firm* — United IP Counselors, LLC

(57) ABSTRACT

A fishing reel forwardly releases a fishing line and includes a reel unit, a spool, a spool brake, an electric component, and a voltage booster circuit. The spool is rotatably supported by the reel unit. The spool brake generates an electric power upon a rotation of the spool, and applies a brake force to brake the spool using the electric power when the spool is rotated. The electric component operates using the electric power generated by the spool brake. The voltage booster circuit increases a voltage supplied to the electric component.

20 Claims, 10 Drawing Sheets

FISHING REEL

CROSS-REFERENCE TO RELATED APPLICATIONS

This application claims priority to Japanese Patent Application No. 2016-010628 filed on Jan. 22, 2016, the entirety of which is hereby incorporated by reference in its entirety.

BACKGROUND

Technical Field

The present disclosure relates to a fishing reel, and particularly to a fishing reel that generates electric power by rotation of a spool and brakes the spool with the generated electric power.

Background Information

As a type of fishing reel, there has been known a dual-bearing reel that performs dynamic braking by generating electric power and braking a spool with the generated electric power and simultaneously controls a braking force with the generated electric power during a casting in which the spool is rotated at high speed in a fishing line releasing direction (see e.g., Japan Laid-open Patent Application Publication No. 2004-208630). In the well-known dual-bearing reel, a spool brake includes a magnet that is unitarily rotatable with the spool and a plurality of coils disposed in the surroundings of the magnet. The magnet has a plurality of magnetic poles arranged in alignment in a rotational direction. The plural coils are disposed in alignment in the rotational direction. In the well-known dual-bearing reel, a controller adjusts the braking force by controlling a duty cycle through pulse width modulation to be performed for electric current to be generated and flow through the coils.

In a well-known mechanism for dynamic braking, it is concerned that when the rotational velocity of the spool gets slow in the latter phase of casting, the voltage of generated electric power lowers and this results in reduction in voltage to be supplied to the controller and reduction in voltage of a control signal (e.g., duty cycle for spool braking), whereby an electric component cannot be normally operated.

BRIEF SUMMARY

It is an object of the present disclosure to prevent an unstable operation of an electric component used for a control purpose in a fishing reel that causes the electric component to operate with electric power generated by braking, even when the rotational velocity of a spool is low and the voltage of the generated electric power is low.

A fishing reel according to the present disclosure forwardly releases a fishing line. The fishing reel includes a reel unit, a spool, a spool brake, a spool controller, an electric component and a voltage booster circuit. The spool is supported by the reel unit so as to be rotatable in a fishing line winding direction and a fishing line releasing direction. The spool brake generates an electric power and brakes the spool with the electric power when the spool is rotated at least in the fishing line releasing direction. The spool controller controls a braking force of the spool brake. The electric component operates with the electric power generated by the spool brake. The voltage booster circuit increases a voltage supplied to the electric component.

The fishing reel causes the voltage booster circuit to increase the voltage supplied to the electric component. With this configuration, the electric component can be prevented from operating in an unstable manner even when the voltage of the generated electric power is low.

The voltage booster circuit in the fishing reel can increase the voltage of a control signal outputted from the spool controller. According to this configuration, a voltage of the control signal, which is liable to be affected by a reduction in a voltage and greatly affects a control action per se, is increased. Hence, the electric component can be prevented from operating in an unstable manner, and furthermore, the control action per se, affected by the control signal, can be prevented from being performed in an unstable manner.

The spool brake can include a magnet and a plurality of coils. The magnet can be coupled to the spool in a unitarily rotatable state, and can have a plurality of magnetic poles aligned in a circumferential direction. The plurality of coils can be disposed on an outer peripheral side of the magnet, and can be aligned in a rotational direction of the spool. According to this construction, electric power can be easily generated by the rotation of the spool.

The fishing reel can further include a rotation detector, a rotational velocity calculator and a deceleration calculator. The rotation detector detects a rotation of the spool. The rotational velocity calculator calculates a rotational velocity of the spool based on an output from the rotation detector. The deceleration calculator calculates a deceleration of the spool based on the rotational velocity calculated by the rotational velocity calculator. When the deceleration calculated by the deceleration calculator is greater than or equal to a predetermined value, the spool brake brakes the spool with the braking force having a maximum magnitude obtainable at a point of time at which the calculation of the deceleration by the deceleration calculator is made. According to this configuration, when the rotation of the spool acutely slows down, the spool is braked with the braking force having the maximum magnitude (e.g., a duty of 100%) obtainable at this point of time. Hence, even when the rotational velocity of the spool acutely decelerates, backlash is unlikely to occur.

The fishing reel can further include an electric storage element that stores the electric power generated by the spool brake. According to this construction, electric power can be stored in the electric storage element. Hence, even when the spool brake stops generating electric power, the control action can continue to be performed until the electric storage element becomes incapable of supplying electric power.

Overall, according to the present disclosure, the electric component can be prevented from operating in an unstable manner even when the voltage of generated electric power is low.

BRIEF DESCRIPTION OF THE DRAWINGS

Referring now to the attached drawings which form a part of this original disclosure.

DETAILED DESCRIPTION OF EMBODIMENTS

<Entire Construction>

Figure 1:
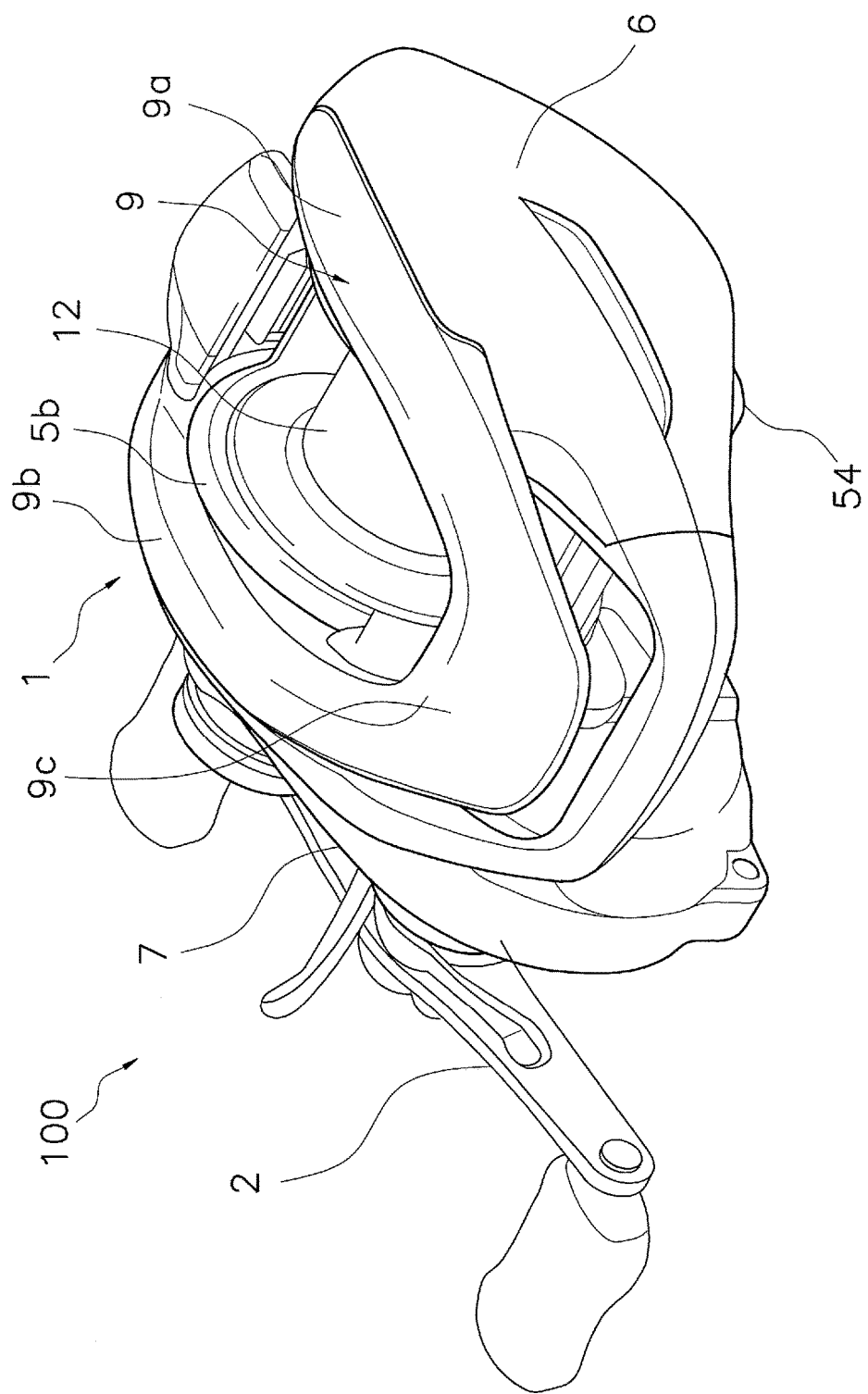
FIG. 1 is a perspective view of a dual-bearing reel provided as a fishing reel according to a preferred embodiment of the present disclosure.

As shown in FIGS. 1, 2, 3 and 7, a dual-bearing reel 100 is a compact bait-casting reel and is provided as a fishing reel according to a preferred embodiment of the present disclosure. The dual-bearing reel 100 includes a reel unit 1, a handle 2, a spool 12, a spool brake 22 (see FIGS. 2 and 7), an electric component 18 (see FIG. 7) including a spool controller 25, a rotation detector 31 (see FIG. 7) and a voltage booster circuit 41 (see FIG. 7).

<Reel Unit>

The reel unit 1 includes a frame 5, a first side cover 6 and a second side cover 7. The frame 5 is an integrally formed component. The first side cover 6 is disposed laterally to the frame 5 on the opposite side of the handle 2. The second side cover 7 is disposed laterally to the frame 5 on the same side as the handle 2.

Figure 2:
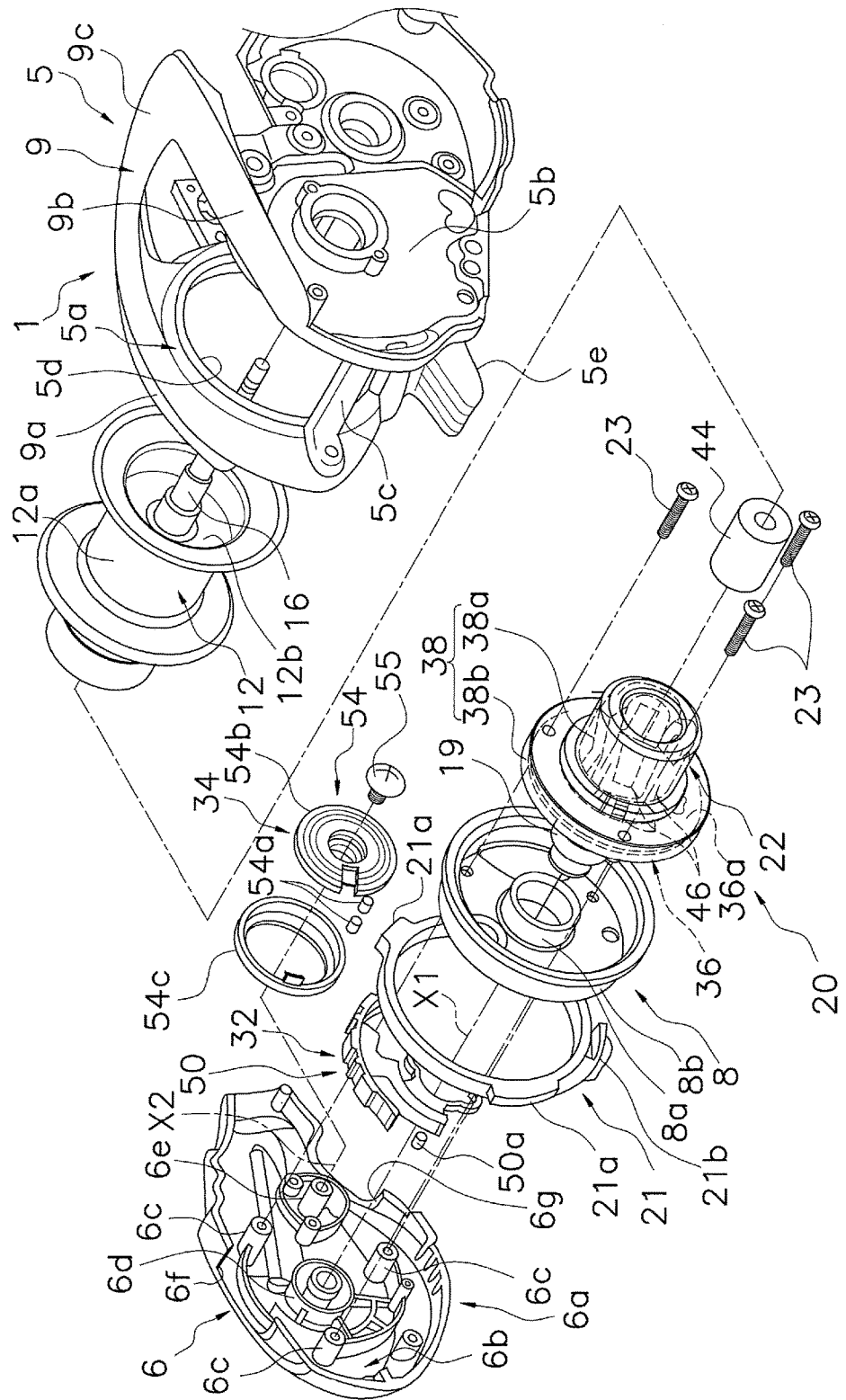
FIG. 2 is an exploded perspective view of the dual-bearing reel including a spool brake mechanism.

As shown in FIG. 2, the frame 5 includes a first side plate 5a, a second side plate 5b, a plurality of coupling portions 5c and a thumb rest 9. The first side plate 5a is disposed on the opposite side of the handle 2. The second side plate 5b is opposed to the first side plate 5a. The coupling portions 5c couple the first side plate 5a and the second side plate 5b. The first side plate 5a includes a circular opening 5d enabling the spool 12 to pass through the first side plate 5a. Among the plural coupling portions 5c, the one coupling portion 5c coupling the first side plate 5a and the second side plate 5b on the bottom side is provided with a fishing rod attachment leg 5e, and the fishing rod attachment leg 5e can be attached to a fishing rod. The spool brake mechanism 20 is detachably mounted to a position about the opening 5d on the first side plate 5a of the frame 5. The first side cover 6 is detachably mounted to the first side plate 5a of the frame 5. The first side cover 6 includes a cover body 6a and a shaft support portion 8 mounted to an inner surface 6b of the cover body 6a.

A plurality of (e.g., three) fixation bosses 6c are provided on the inner surface 6b of the cover body 6a and fix the shaft support portion 8 to the cover body 6a. Additionally, a first mount boss 6d and a second mount boss 6e are separately provided on the inner surface 6b and enable a first selector 32 (to be described) and a second selector 34 (to be described) of the spool brake mechanism 20 to be rotatably mounted to the cover body 6a. The first mount boss 6d has a tubular shape formed about a first axis X1. The second mount boss 6e has a shape formed about a second axis X2 arranged in parallel to the first axis X1. The second axis X2 is arranged forward of the first axis X1 and adjacently to the fishing rod attachment leg 5e. The first axis X1 is arranged coaxially to a spool shaft 16 (to be described) when the cover body 6a is mounted to the first side plate 5a.

Figure 4:
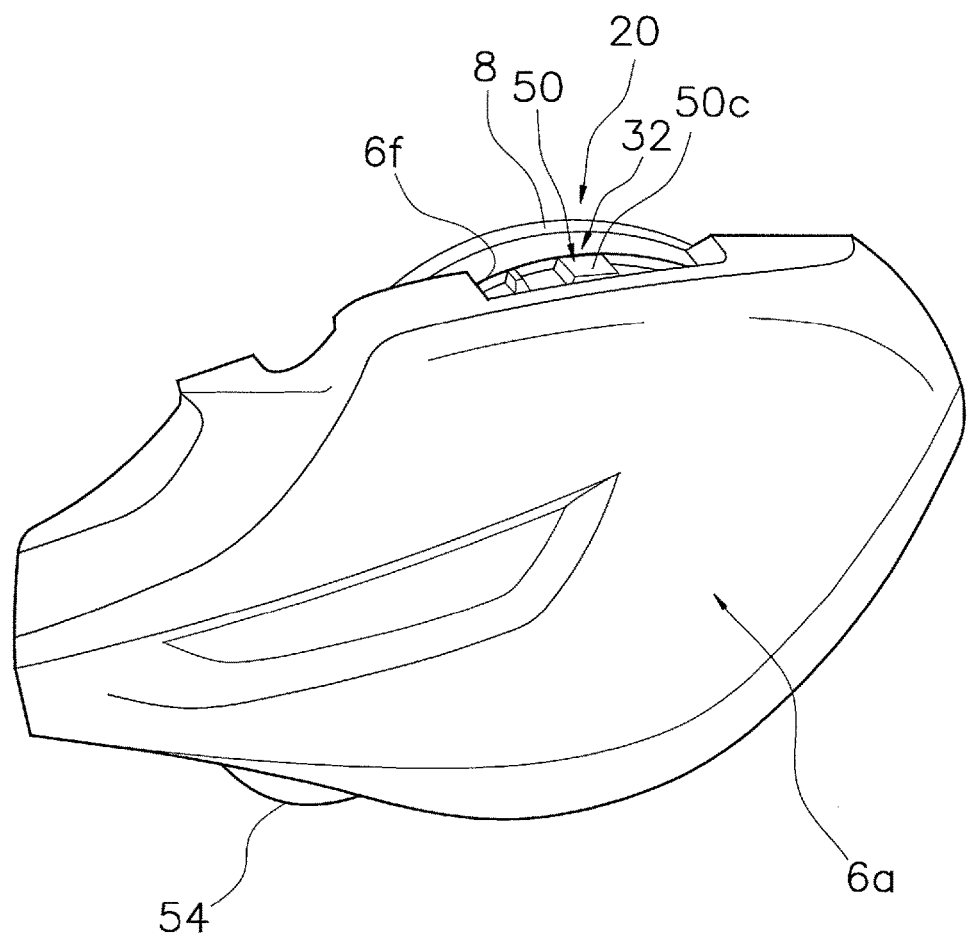
FIG. 4 is a perspective view of the spool brake mechanism.

The cover body 6a is disposed in contact with the thumb rest 9 and is covered with a first bulge 9a (to be described) of the thumb rest 9. A part of the cover body 6a, covered with the first bulge 9a, includes a first opened part 6f. The first opened part 6f has a rectangular shape and enables the first selector 32 to be exposed through the cover body 6a. Therefore, as shown in FIG. 4, the first selector 32 is inoperable unless the first side cover 6 is detached from the frame 5. The cover body 6a has a second opened part 6g below the second mount boss 6e. The second opened part 6g has a rectangular shape and enables the second selector 34 to outwardly protrude through the second opened part 6g. Therefore, the second selector 34 is operable even while fishing.

One end of the spool shaft 16 of the spool 12 is rotatably supported by the shaft support portion 8. The shaft support portion 8 is a flat cylindrical member having a partially closed end. The shaft support portion 8 includes a tubular bearing accommodation part 8a in its center. The bearing accommodation part 8a protrudes from the inner surface of the shaft support portion 8 and accommodates a bearing 19 whereby the aforementioned one end of the spool shaft 16 is rotatably supported. An attachment/detachment ring 21 is rotatably mounted to an outer peripheral surface 8b of the shaft support portion 8. The attachment/detachment ring 21 is provided for attaching/detaching the shaft support portion 8 to/from a position about the opening 5d on the first side plate 5a. The attachment/detachment ring 21 detachably attaches the shaft support portion 8 to the first side plate 5a with a conventional bayonet structure. The attachment/detachment ring 21 has a plurality of (e.g., three) pawls 21a and an operation knob 21b. The pawls 21a protrude radially outward from the outer peripheral surface of the attachment/detachment ring 21. The operation knob 21b is provided for performing an attachment/detachment operation. The plural pawls 21a respectively have a slope with a gradually decreasing thickness, and are engaged with a plurality of engaging grooves (not shown in the drawings) provided about the opening 5d.

When the attachment/detachment ring 21 is rotated in one direction (e.g., counterclockwise direction in FIG. 2) by downwardly operating the operation knob 21b with a fingertip, the pawls 21a are disengaged from the engaging grooves, and the shaft support portion 8 and the first side cover 6 are unlocked from the first side plate 5a. Contrarily, when the attachment/detachment ring 21 is rotated in the other direction by, for instance, upwardly operating the operation knob 21b with the fingertip, the pawls 21a are engaged with the engaging grooves, and the shaft support portion 8 and the first side cover 6 are locked to the first side plate 5a. The shaft support portion 8 is fixed to the first side cover 6 together with a part of the constituent elements of the spool brake mechanism 20 by a plurality of (e.g., three) bolt members 23. In the condition that the shaft support portion 8 is fixed to the first side cover 6, the attachment/detachment ring 21 is restricted from moving in a spool shaft direction and is rotatable with respect to the shaft support portion 8.

As shown in FIGS. 1 and 2, the thumb rest 9 includes the first bulge 9a, a second bulge 9b and a third bulge 9c. The first bulge 9a outwardly bulges from the upper part of the first side plate 5a. The second bulge 9b outwardly bulges from the upper part of the second side plate 5b. The third bulge 9c forwardly bulges, and couples the first side plate 5a and the second side plate 5b at the front part of the frame 5.

The handle 2 is rotatably supported by the reel unit 1. The spool 12 is rotatably held by the reel unit 1, and is disposed between the first side plate 5a and the second side plate 5b. Rotation of the handle 2 is transmitted to the spool 12 through a rotation transmission mechanism (not shown in the drawings). A clutch mechanism is mounted to an intermediate part of the rotation transmission mechanism. The clutch mechanism switches the spool 12 between an off state and an on state. In the off state, the spool 12 becomes freely rotatable. In the on state, the rotation of the handle 2 is transmitted to the spool 12.

<Spool>

Figure 3:
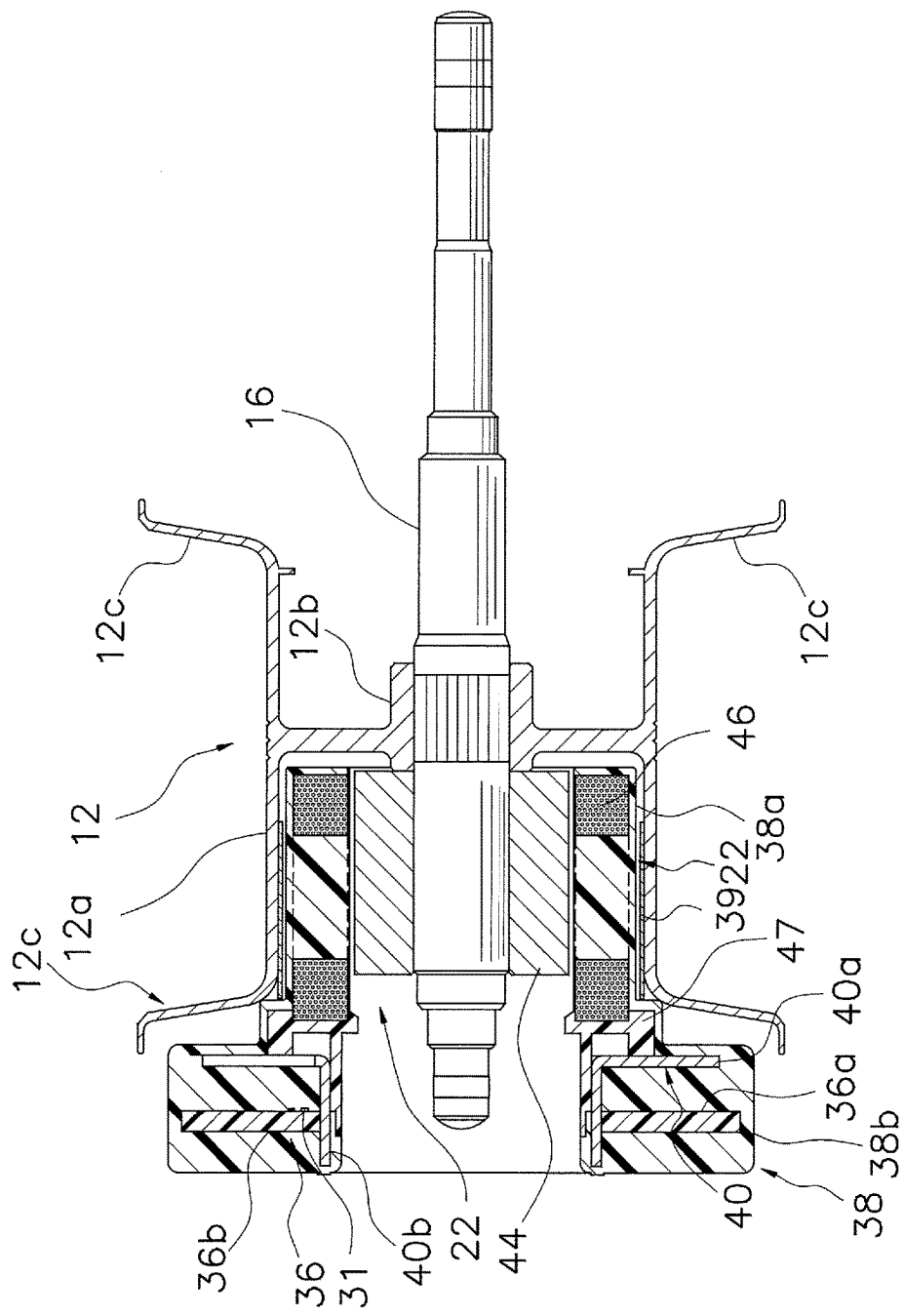
FIG. 3 is a cross-sectional view of a spool brake in a condition that a circuit board and coils are covered with a cover member.

As shown in FIG. 3, the spool 12 includes a bobbin trunk 12a, a tubular part 12b and a pair of flanges 12c. The bobbin trunk 12a is capable of having the fishing line wound about the bobbin trunk 12a. The tubular part 12b is integrated with the bobbin trunk 12a and is fixed onto the spool shaft 16. The flanges 12c are provided on both axial ends of the bobbin trunk 12a and respectively have a large diameter. The spool shaft 16 is coupled to the inner peripheral surface of the tubular part 12b in a unitarily rotatable state. The aforementioned one end of the spool shaft 16 is rotatably supported by the shaft support portion 8 through the bearing 19. The other end of the spool shaft 16 is rotatably supported by the second side cover 7 through a bearing (not shown in the drawings).

<Spool Brake Mechanism>

Figure 7:
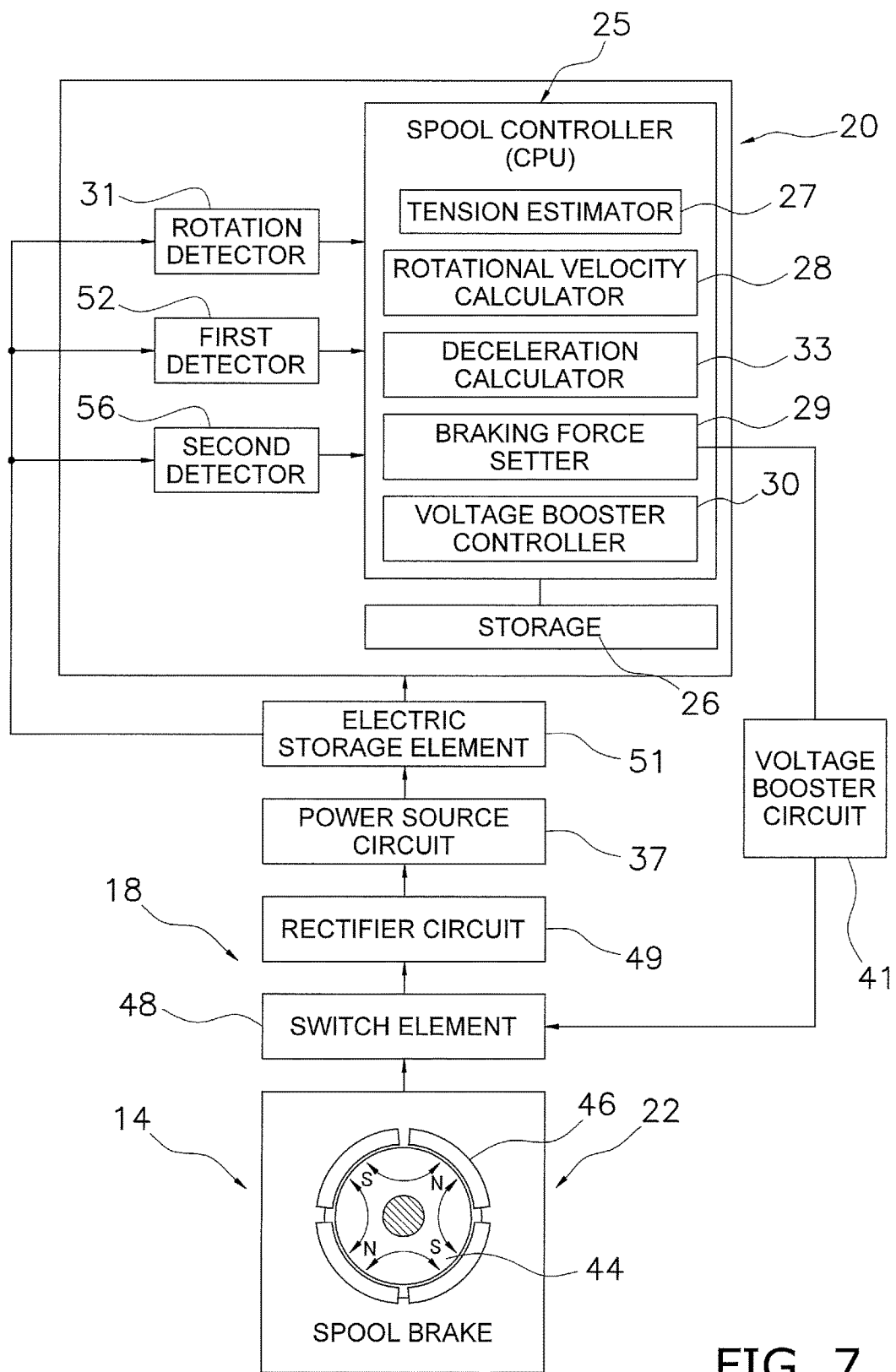
FIG. 7 is a block diagram showing a configuration of the spool brake mechanism.

As shown in FIGS. 3 and 7, the spool brake mechanism 20 includes the spool brake 22 and the spool controller 25 for controlling the spool brake 22. The spool brake 22 (generator) performs a dynamic braking of the spool 12, and specifically generates electric power when the spool 12 is rotated at least in the fishing line releasing direction and brakes the spool 12 with the generated electric power in an electrically controllable manner. The spool brake 22 is an example of a generating means. The spool brake 22 includes a magnet 44 mounted to the spool 12 in a unitarily rotatable state and a plurality of coils 46 connected in series. The magnet 44 is mounted to the spool shaft 16 in a unitarily rotatable state. In the present preferred embodiment, the magnet 44 is fixed to the spool shaft 16 by adhesion. The magnet 44 is a cylindrical magnet magnetized to have magnetic anisotropy. The magnet 44 has a plurality of magnetic poles arranged in alignment in the rotational direction of the spool 12.

The plural coils 46 are disposed in opposition to the magnet 44. In the present preferred embodiment, the plural coils 46 are disposed on the outer peripheral side of the magnet 44, and are aligned at predetermined intervals in a tubular arrangement. The coils 46 are attached to a circuit board 36 (to be described) through a coil attaching member 47. Wires of the coils 46 are respectively wound in a roughly rectangular shape. The wound wires are opposed to the magnet 44, and are disposed within the magnetic field of the magnet 44. For example, four coils 46 are herein provided. Each of the coils 46 has a circular-arc curved shape. The plural coils 46 are circumferentially disposed at intervals and the entirety of each of the plural coils 46 has a roughly tubular shape. Both ends of the plural coils 46 connected in series, and are electrically connected to a switch element 48 mounted to the circuit board 36. The switch element 48 is connected to a rectifier circuit 49. The rectifier circuit 49 converts alternating current output from the coils 46 into direct current.

<Electric Component>

The electric component 18 operates with electric power generated by the spool brake 22. Thus, the electric component 18 is an example of an electric power consuming means. The electric component 18 can be the spool controller 25, the switch element 48 that can be controlled by the spool controller 25, and so forth. The electric component 18 is either mounted or connected to the circuit board 36 (to be described below). The spool controller 25 is an exemplary controller. The switch element 48 turns on/off electric current in accordance with a duty cycle D outputted from the spool controller 25. The switch element 48 is an example of a switching means. The electric current switched by the switch element 48 can be generated by a relative rotation between the magnet 44 and the coils 46 in the spool brake 22. In the present preferred embodiment, the switch element 48 is implemented by, for instance, a field effect transistor. The switch element 48 is controlled to turn on/off the electric current in accordance with a control signal outputted from a braking force setter 29 to control the duty cycle D, and outputs a frequency modulated output to the rectifier circuit 49. The electric current, herein turned on/off, can be stored in an electric storage element 51 through the rectifier circuit 49 and a power source circuit 37.

<Rotation Detector>

Figure 5:
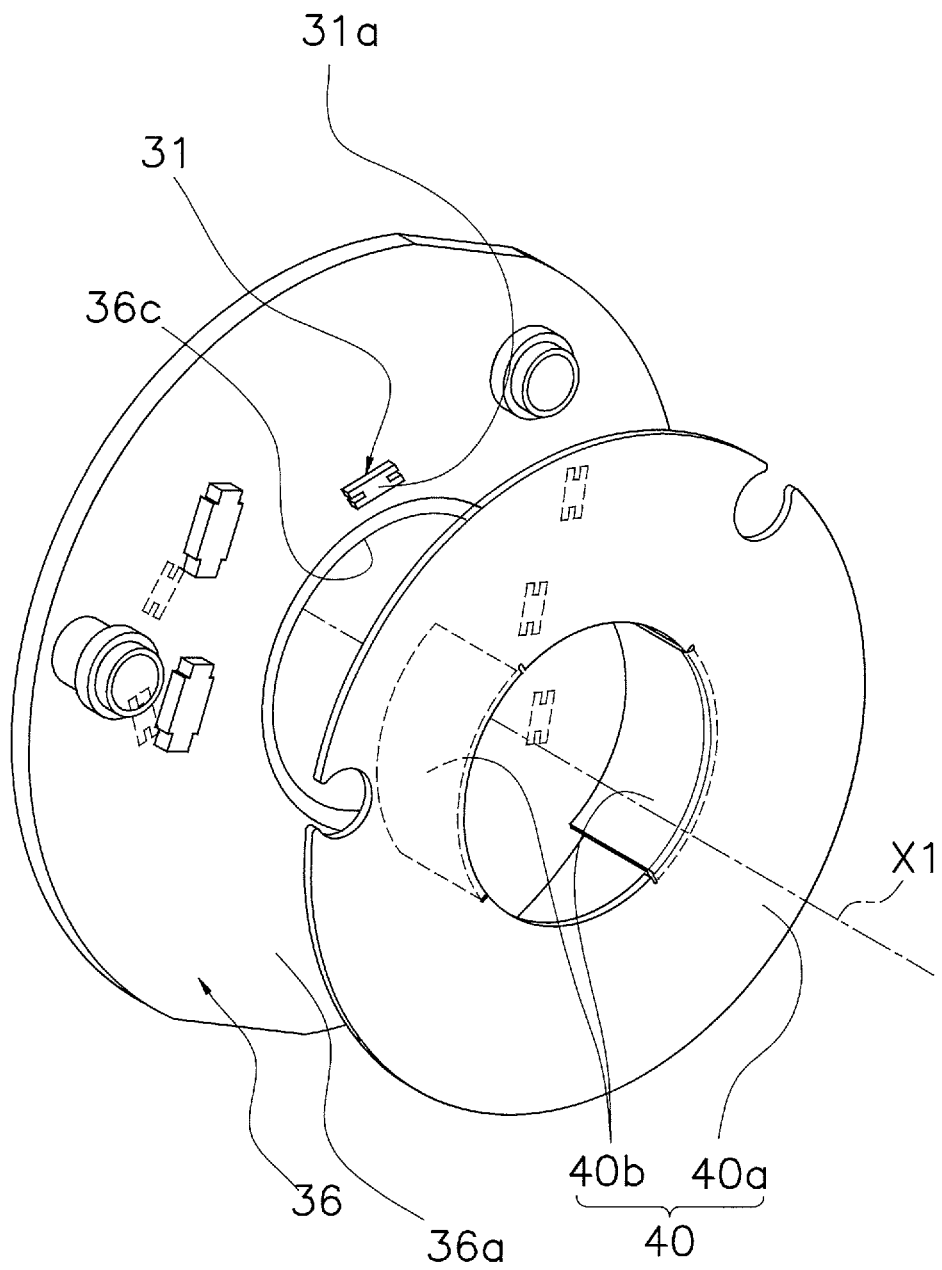
FIG. 5 is an exploded perspective view of the circuit board and a magnetic flux shield member.
Figure 6:
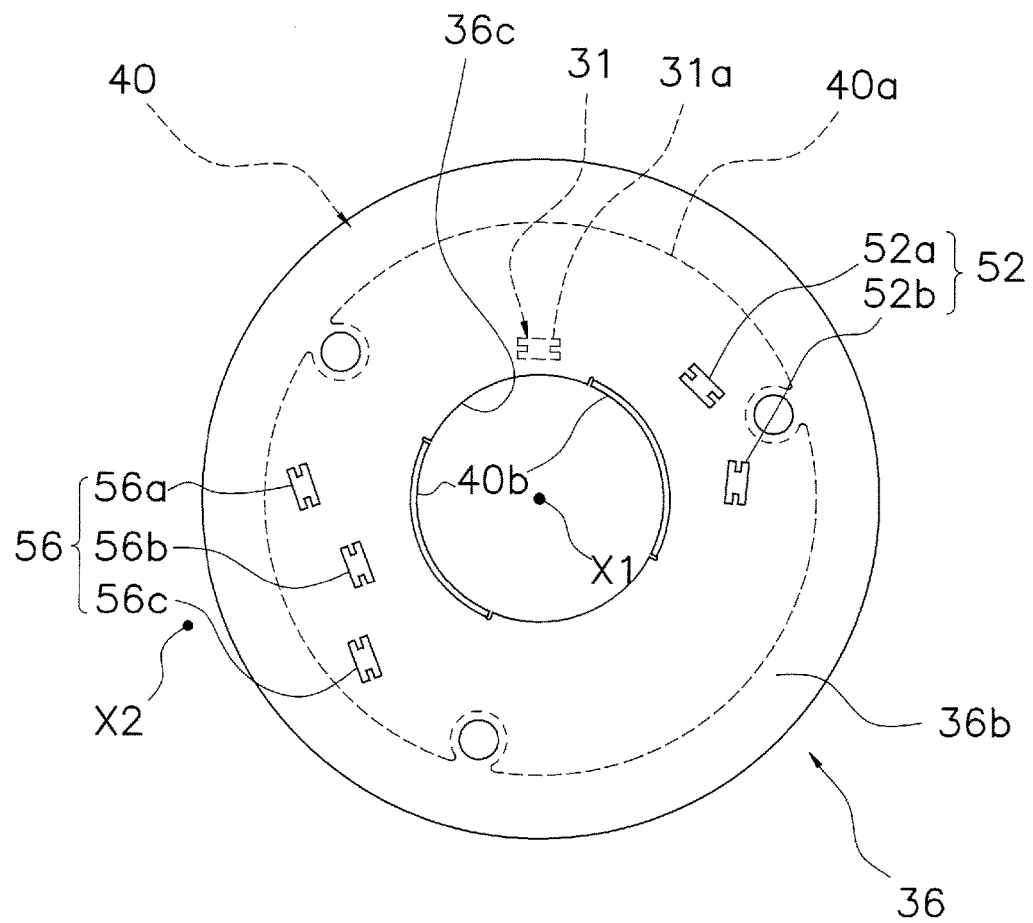
FIG. 6 is a bottom view of the circuit board seen from its second surface side.

The rotation detector 31 is mounted to the circuit board 36. The rotation detector electrically detects the rotation of the spool 12. As shown in FIGS. 3, 5 and 6, the rotation detector 31 includes a hall element 31a. The hall element 31a is mounted to the inner peripheral region of a first surface 36a of the circuit board 36, and is located in a position opposed to a gap between an adjacent two of the four coils 46. The hall element 31a is a type of sensor that can be turned on and off in accordance with a plurality of predetermined rotational phases of the magnet 44. The rotation detector 31 is provided for calculating a rotational velocity ω of the spool 12. Additionally, it is possible to calculate a positive/negative rotational acceleration ωa, and to estimate a tension F acting on the fishing line based on variation in the rotational velocity ω of the spool 12 with time.

<Voltage Booster Circuit 41>

As shown in FIG. 7, the voltage booster circuit 41 is disposed on a control signal line CL between the spool controller 25 and the switch element 48 composing the electric component 18. The switch element 48 is another example of an electric power consuming means. The voltage booster circuit 41 includes an amplifier. The voltage booster circuit 41 increases the voltage of a control signal. Specifically, the voltage booster circuit 41 increases the voltage of a control signal output from the spool controller 25 to control the duty cycle D.

The spool brake 22 changes the duty cycle D by causing the switch element 48 to switch on and off electric current generated by relative rotation between the magnet 44 and the coils 46. Accordingly, the spool 12 is braked with a variable magnitude of braking force. The braking force generated by the spool brake 22 is strengthened with an increase in a length of a switch-on time by the switch element 48 (i.e., with an increase in a magnitude of the duty cycle D). The switch element 48 is connected to the electric storage element 51 through the rectifier circuit 49 and the power source circuit 37. The electric storage element 51 stores electric power generated by the coils 46 during a casting. The electric storage element 51 functions as a power source to supply electric power to the spool controller 25 and the electric component 18 connected to the spool controller 25. The electric storage element 51 is implemented by, for instance, an electrolytic capacitor.

As shown in FIG. 7, the spool controller 25 is implemented by a microcomputer including a ROM (such as a PROM, an EPROM, an EEPROM, a Flash EEPROM, an optical memory, a magnetic memory, or a flash memory), a RAM (such as a SDRAM, a DDR SDRAM, or a Rambus DRAM), and a CPU (such as a RISC microprocessor, a CISC microprocessor, an ASIC microprocessor, a Superscalar Processor, or a Digital Signal microprocessor). The CPU of the spool controller 25 can also be a programmable logic device (PLD) such as a programmable logic array device (PLA), a programmable array logic device (PAL), a generic array logic device (GAL), a complex programmable logic device (CPLD), or a field-programmable gate array device (FPGA). The spool controller 25 is an example of a control means. A storage 26 is connected to the spool controller 25. The storage 26 is implemented by a non-volatile memory such as an EEPROM, ferroelectric RAM, optical memory, or a flash memory. The rotation detector 31, a first detector 52 and a second detector 56 are electrically connected to the spool controller 25. The rotation detector 31, the first detector 52 and the second detector 56 are implemented at least partially by hardware mounted to the circuit board 36.

The spool controller 25 includes a tension estimator 27, a rotational velocity calculator 28, a deceleration calculator 33, the braking force setter 29 and a voltage boost controller 30 as functional constituent elements implemented by software and/or hardware. The rotational velocity calculator 28 calculates a rotational velocity ω of the spool 12 based on an output signal from the rotation detector 31. The deceleration calculator 33 calculates a deceleration—ωa of the spool 12 (i.e., a negative rotational acceleration) based on information outputted from the rotational velocity calculator 28. The tension estimator 27 estimates the tension F acting on the fishing line based on the information outputted from the rotational velocity calculator 28. The braking force setter 29 sets a first duty cycle D1 and a second duty cycle D2. The first duty cycle D1 reduces with an elapse of a period of time and is used as a base duty cycle. The second duty cycle D2 is used for correcting the first duty cycle D1.

The tension F can be estimated by a rate of change (Δω/Δt) of the rotational velocity ω of the spool 12 and an inertia moment J of the spool 12. When the rotational velocity of the spool 12 varies during a casting, the rotational velocity at this time is different from the rotational velocity of the spool 12 independently and freely rotating without receiving a tension from the fishing line. The difference is attributed to a rotational driving force (i.e., torque) generated by the tension from the fishing line. A driving torque T can be expressed with the following equation (1), where the rate of change of the rotational velocity at this time is (Δω/Δt).

$$T = J \times (\Delta\omega/\Delta t) \quad (1)$$

When the driving torque T is calculated by the equation (1), the tension F can be estimated with the radius of a point of action of the fishing line (normally 15 to 20 mm). Therefore, in the present preferred embodiment, the tension F can be estimated by a calculation with the rate of change of the rotational velocity ω.

The spool controller 25 changes the braking force (duty cycle D) by performing a duty control for the switch element 48. The spool controller 25 changes the braking force in accordance with the tension F estimated by the tension estimator 27 and a reference tension Fr. The magnitude of the reference tension Fr is set in accordance with a plurality of brake modes. It should be noted that in the present preferred embodiment, the reference tension Fr is "0". The storage 26 stores a plurality of data sets associated with the plurality of brake modes.

Moreover, the spool brake mechanism 20 further includes the rotation detector 31 shown in FIGS. 5 and 7, the first selector 32, the second selector 34, the circuit board 36, a cover member 38, a first magnetic flux shield member 39 and a second magnetic flux shield member 40, which are shown in FIGS. 2, 3 and 4. As shown in FIGS. 3, 5 and 6, the rotation detector 31 includes a hall element 31a. The hall element 31a is mounted to the inner peripheral region of the first surface 36a of the circuit board 36, and is located in a position opposed to the gap between an adjacent two of the four coils 46. The hall element 31a can be a low-cost sensor that can be only turned on and off in accordance with the predetermined rotational phases of the magnet 44. The rotation detector 31 is provided for calculating the rotational velocity ω of the spool 12. Additionally, the rotational acceleration ωa and the tension F acting on the fishing line also can be calculated based on a variation in the rotational velocity ω of the spool 12 over a period of time.

The first selector 32 is provided for selecting any one of a plurality of brake modes of the spool brake 22 in accordance with a plurality of types of fishing line or so forth. In the present preferred embodiment, for instance, one of four brake modes is selectable.

The first selector 32 includes a first selection operating portion 50 and the first detector 52 (see FIGS. 6 and 7). The first selection operating portion 50 includes at least one (e.g., two) first magnet 50a. The first detector 52 is opposed to the two first magnets 50a and detects the selection position of the first selection operating portion 50.

The first selection operating portion 50 is mounted to the reel unit 1 such that the first selection operating portion 50 is movable within a first range divided into positions corresponding to a plurality of levels. In the present preferred embodiment, the first selection operating portion 50 is rotatably mounted to the inner surface 6b of the cover body 6a such that the first selection operating portion 50 is settable in, for instance, any one of the positions corresponding to three levels within the first range. The first selection operating portion 50 includes a lever member 50b to which the (e.g., two) first magnets 50a are mounted. The lever member 50b includes a first exposed part 50c on a tip of the lever member 50b. The first exposed part 50c curves in a circular-arc shape and includes a plurality of convex parts 50d. The convex parts 50d are located on the surface of the first exposed part 50c, and are circumferentially aligned at intervals. The lever member 50b is attached to the outer peripheral surface of the first mount boss 6d such that the lever member 50b is rotatable about the first axis X1 within a first range. The first range is an angular range of, for instance, 30 degrees or less. In the present preferred embodiment, the first mount boss 6d is disposed concentrically to the spool shaft 16. Thus, the first selection operating portion 50 is rotated about the spool shaft 16. When the first selection operating portion 50 is mounted to the first side cover 6, the first exposed part 50c is exposed through the first opened part 6f while protruding from the first side cover 6. However, when the first side cover 6 is mounted to the first side plate 5a, the first opened part 6f is covered by the thumb rest 9, and the first exposed part 50c of the first selection operating portion 50 hides in the reel unit 1. With this construction, it is possible to avoid a situation that the adjusted condition is changed against a user's intention in carrying out fishing.

As shown in FIGS. 5 and 6, the first detector 52 is disposed on an outer peripheral region of a second surface 36b of the circuit board 36, and away from the magnet 44. The first detector 52 includes two hall elements 52a and 52b. The hall elements 52a and 52b are disposed on the second surface 36b such that they can be opposed to the two first magnets 50a. The two hall elements 52a and 52b can be low-cost elements similar to the hall element 31a, and are disposed about the first axis X1 at an interval away from the first axis X1.

The second selector 34 is provided for selecting any one of a plurality of brake types. The magnitude of braking force used as a basis is set differently for each of the brake types. In the present preferred embodiment, any one of eight brake types can be selected by the second selector 34. The eight brake types are composed of Type 1 to Type 8. In the eight brake types, the magnitude of the braking force increases in order from Type 1 to Type 8. The second selector 34 includes a second selection operating portion 54 and the second detector 56. The second selection operating portion 54 includes at least one (e.g., three) second magnet 54a. In a preferred embodiment, the second detector 56 is opposed to three second magnets 54a and detects the adjustment position of the second selection operating portion 54.

The second selection operating portion 54 is mounted to the reel unit 1 such that the second selection operating portion 54 is movable within a second range divided into positions corresponding to a plurality of levels. In the present preferred embodiment, the second selection operating portion 54 is rotatably mounted to the inner surface 6b of the cover body 6a such that the second selection operating portion 54 is settable in, for instance, any one of the positions corresponding to five levels within the second range. The second range is an angular range of, for instance, 120 degrees or less. The second selection operating portion 54 includes an operating portion body 54b and a second exposed part 54c. The operating portion body 54b is a member to which the (e.g., three) second magnets 54a are mounted. The second exposed part 54c is fixed to the operating portion body 54b by, for instance, elastic coupling. The operating portion body 54b is attached to the inner surface 6b of the cover body 6a by a screw member 55 that is screwed into the second mount boss 6e such that the operating portion body 54b is rotatable about the second axis X2. When the first side cover 6 is mounted to the first side plate 5a, the second exposed part 54c is exposed through the second opened part 6g. With this construction, the position of the second selection operating portion 54 can be adjusted with a fingertip of the user's hand holding the dual-bearing reel 100 on the palm in carrying out fishing.

As shown in FIG. 6, the second detector 56 is disposed on the outer peripheral region of the second surface 36b of the circuit board 36, and away from the magnet 44. The second detector 56 is disposed on the second surface 36b of the circuit board 36, and away from the first detector 52 substantially at an angular interval of 180 degrees. The second detector 56 includes three hall elements 56a, 56b and 56c. The three hall elements 56a, 56b and 56c are disposed on the second surface 36b of the circuit board 36 such that they can be opposed to the three second magnets 54a. The three hall elements 56a, 56b and 56c can be low-cost elements similar to the hall element 31a, and are disposed about the second axis X2 at intervals.

The circuit board 36 has a disc shape and a through hole 36c. The circuit board 36 is mounted to one of the surfaces of the shaft support portion 8, i.e., the surface opposed to the spool 12, and is disposed on the outer peripheral side of the bearing accommodation part 8a. The circuit board 36 includes the first surface 36a and the second surface 36b. The first surface 36a is the surface to which the coils 46 are mounted. The second surface 36b is on the opposite side of the first surface 36a. The circuit board 36 is fixed to the first side cover 6 together with the shaft support portion 8, the cover member 38 and the second magnetic flux shield member 40 by the bolt members 23.

As shown in FIGS. 2 and 5, the cover member 38 is a stepped tubular member made of synthetic resin and is provided for insulating the circuit board 36, the coils 46 and the electric component 18 mounted to the circuit board 36. The cover member 38 includes a first cover part 38a and a second cover part 38b. The first cover part 38a covers the tips, the inner peripheral parts and the outer peripheral parts of the plural coils 46. The second cover part 38b is integrated with the first cover part 38a, and covers the outer peripheral part, the inner peripheral part, the first surface 36a and the second surface 36b of the circuit board 36. The first cover part 38a is disposed on the outer peripheral side of the magnet 44. Put differently, the cover member 38 seals the circuit board 36 by covering the entire surface of the circuit board 36 to which the coils 46 and the electric component 18, including the detectors, are mounted.

As shown in FIG. 3, the first magnetic flux shield member 39 is mounted to the inner peripheral surface of the bobbin trunk 12a of the spool 12, and is thereby unitarily rotatable with the spool 12. The first magnetic flux shield member 39 is a tubular member made of iron. The first magnetic flux shield member 39 is provided for increasing the magnetic flux density of the magnet 44 in the surroundings of the coils 46. The first magnetic flux shield member 39 is also provided for making the rotation detector 31 unlikely to be affected by the magnetic flux of the magnet 44.

As shown in FIGS. 5 and 6, the second magnetic flux shield member 40 is a circular member made of, for instance, an iron plate. The second magnetic flux shield member 40 is provided for shielding the magnetic flux of the magnet 44 directed toward the first detector 52 and the second detector 56. With the second magnetic flux shield member 40 being provided, the first detector 52 and the second detector 56 can accurately detect the first magnets 50a and the second magnets 54a without being affected by the magnetic flux of the magnet 44. The second magnetic flux shield member 40 is fixed by the bolt members 23 to the first side cover 6 together with the shaft support portion 8 and the circuit board 36 sealed by the cover member 38.

The second magnetic flux shield member 40 includes a first shield part 40a having a ring shape and a pair of second shield parts 40b. The first shield part 40a is fixed to the coil attaching member 47 by, for instance, an adhesive. The second shield parts 40b extend from the first shield part 40a, and each has a cross section made in the shape of a circular arc arranged about the first axis X1. The first shield part 40a is opposed to the first surface 36a of the circuit board 36 at an interval away from the first surface 36a.

The pair of second shield parts 40b is located at an angular interval of 180 degrees about the first axis X1 so as to prevent the magnetic flux of the magnet 44 from being directed to the first detector 52 and the second detector 56. The second shield parts 40b are disposed in positions opposed to the first detector 52 and the second detector 56. The axial length of each second shield part 40b is a length such that each second shield part 40b protrudes from the second surface 36b of the circuit board 36 and almost reaches the first side cover 6-side end surface of the cover member 38. With this construction, the magnetic flux of the magnet 44 is prevented from being directed to the first detector 52 and the second detector 56. It should be noted that the second magnetic flux shield member 40 is covered by the cover member 38, and is invisible from outside of the dual bearing reel 100.

When using a different type of fishing line from a previously used fishing line, the spool brake mechanism 20, when constructed as described above, requires a detachment of the first side cover 6 from the reel unit 1. Specifically, when the attachment/detachment ring 21 is rotated in one direction (e.g., counterclockwise direction in FIG. 2) by downwardly operating the operating knob 21b disposed in the rear part of the dual-bearing reel 100 with a fingertip, the spool brake mechanism 20, including the circuit board 36, the first side cover 6 and so forth, can be detached from the reel unit 1. This condition is shown in FIG. 4. Consequently, the first selection operating portion 50 of the first selector 32 is exposed through the first opened part 6f. This enables an operation of selecting a suitable brake mode in accordance with the type of fishing line or so forth. After this operation is finished, the spool brake mechanism 20 can be reattached to the frame 5. During the reattachment, the spool brake mechanism 20 contacts the first side plate 5a, and when the attachment/detachment ring 21 is rotated in the other direction by, for instance, upwardly operating the operation knob 21b with a fingertip, the spool brake mechanism 20 is attached to the frame 5.

Figure 8:
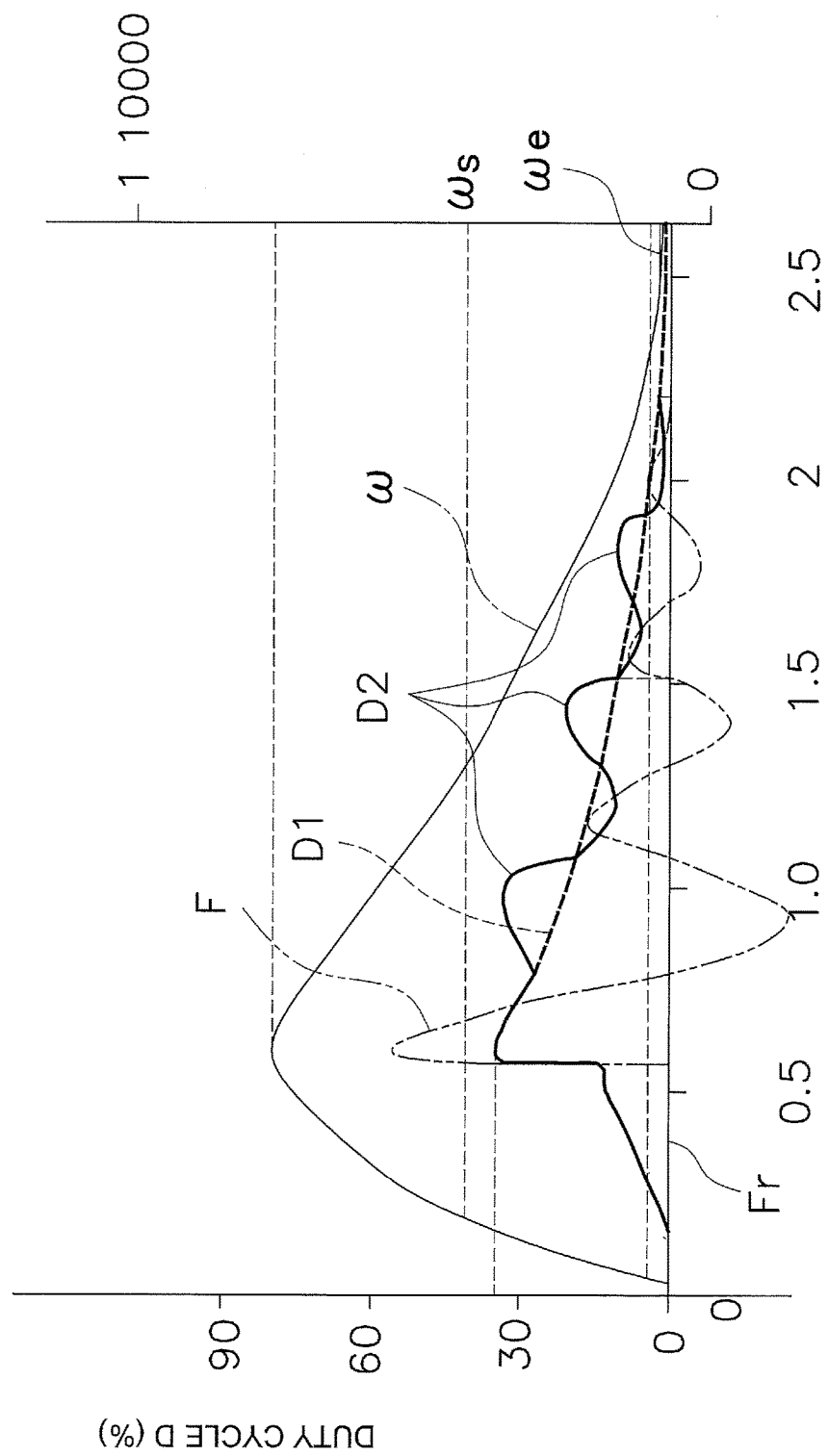
FIG. 8 is a chart explaining a variation in a rotational velocity of a spool and a braking force during a casting.

Next, a control action performed by the spool controller 25 during a casting will be schematically explained with reference to the chart of FIG. 8. It should be noted that in FIG. 8, an elapse of a time t from a starting of a casting is represented in the horizontal axis, whereas the rotational velocity $\omega$ of the spool 12 and the duty cycle D of the braking force are represented in the vertical axis. It should be noted that in the present preferred embodiment, the duty cycle D is determined by the first duty cycle D1 as a base duty cycle and by the second duty cycle D2. The first duty cycle D1 gradually reduces with the elapse of the time t from the starting of the casting. The second duty cycle D2 is set to increase the first duty cycle D1 when the estimated tension F is smaller than the reference tension Fr. Therefore, when the estimated tension F is smaller than the reference tension Fr, the following relationship is established: the duty cycle D=D1+D2. Contrarily, when the estimated tension F is greater than or equal to the reference tension Fr, the second duty cycle D2 is set to be "0" and the following relationship is established: the duty cycle D =D1.

When the casting is started and the spool 12 is rotated, electric power is supplied to the spool controller 25 from the electric storage element 51, and a spool control is started. When electric power is supplied to the spool controller 25, data of the first duty cycle D1 and data of the second duty cycle D2 are read out of the storage 26 in accordance with a brake mode selected in accordance with the operating position of the first selector 32 and the operating position of the second selector 34, and are set in the spool controller 25. At this time, as depicted with a solid line, the rotational velocity $\omega$ of the spool 12 becomes a brake starting rotational velocity $\omega s$ in an early stage of the casting. This timing is the timing to start a braking. The brake starting rotational velocity $\omega s$ falls in a range of, for instance, 4000 to 6000 rpm. In the present preferred embodiment, the brake starting rotational velocity $\omega s$ is 4000 rpm.

The spool controller 25 herein calculates the rotational velocity $\omega$ and the rotational acceleration $\omega a$ based on an output from the rotation detector 31. Based on the calculated rotational acceleration $\omega a$ ($=\Delta\omega/\Delta t$), the spool controller 25 calculates a negative rotational acceleration, i.e., the deceleration $-\omega a$ and simultaneously estimates the tension F. Moreover, the spool controller 25 outputs the second duty cycle D2 in accordance with the estimated tension F and the reference tension Fr.

Figure 9:
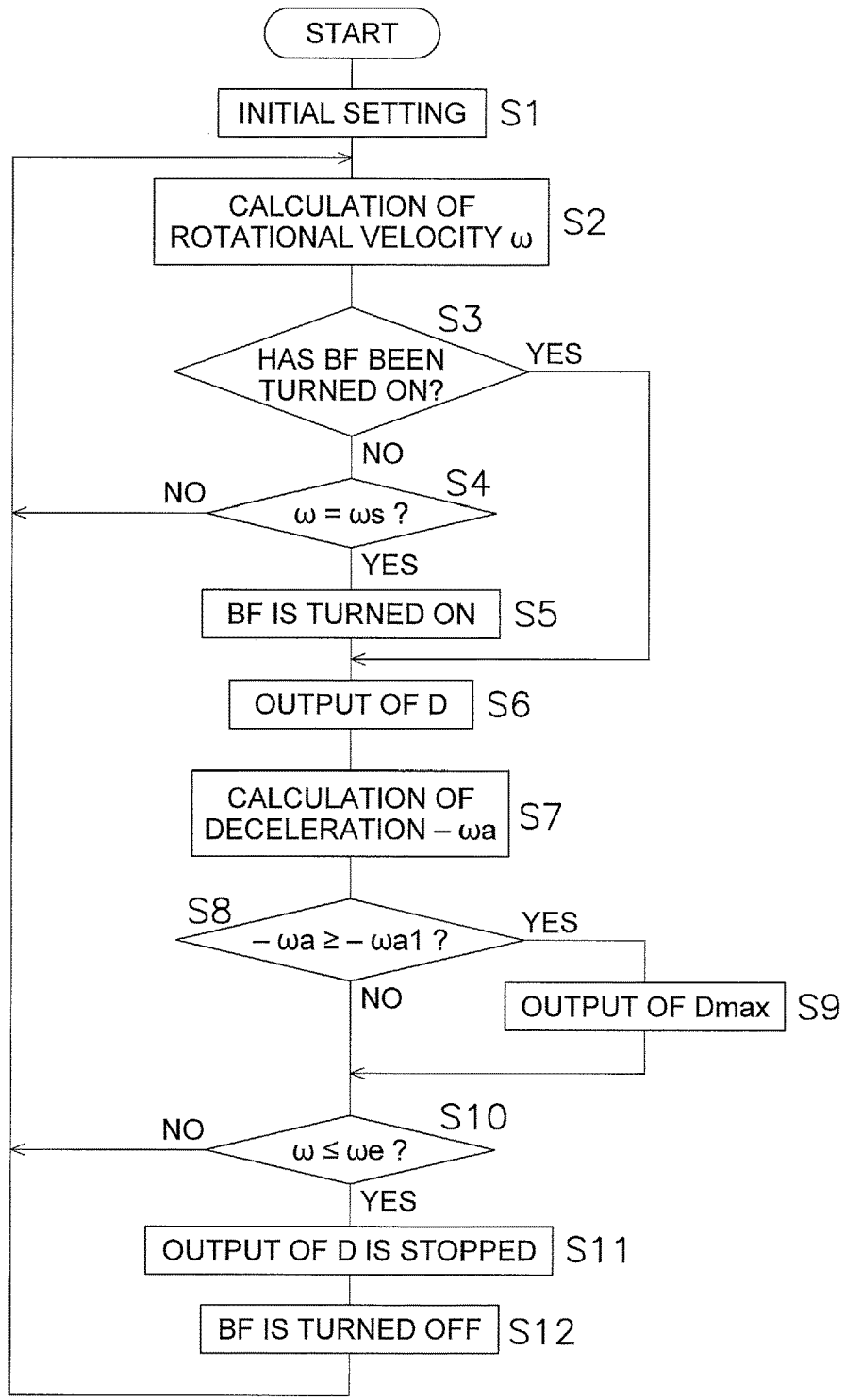
FIG. 9 is a flowchart showing an exemplary control action of a spool controller.

Next, a spool control action of the spool controller 25 will be specifically explained based on the flowchart of FIG. 9. It should be noted that the control flowchart shown in FIG. 9 is an exemplary control action, and the control action of the present disclosure is not limited to this.

When the spool 12 is rotated by the casting, electric power is stored in the electric storage element 51 and is supplied to the spool controller 25. When the voltage of electric power output from the electric storage element 51 exceeds a reset voltage, the spool controller 25 performs an initial setting in step S1 of FIG. 9. Then, the processing proceeds to step S2. In the initial setting, the spool controller 25 resets a variety of items (a flag, a timer, data, etc.). In step S2, the spool controller 25 calculates the rotational velocity $\omega$ based on a pulse outputted from the rotation detector 31. Then, the processing proceeds to step S3.

In step S3, the spool controller 25 determines whether or not a braking flag BF has been turned on. The braking flag BF indicates that the brake control has been started. When the spool controller 25 determines that the braking flag BF has not been turned on yet, i.e., that the brake control has not been started yet, the processing proceeds from step S3 to step S4. In step S4, the spool controller 25 determines whether or not the calculated rotational velocity $\omega$ has reached the brake starting rotational velocity $\omega s$. When the spool controller 25 determines that the rotational velocity $\omega$ has not reached the brake starting rotational velocity $\omega s$ yet, the processing proceeds from step S4 to step S2. Contrarily, when the spool controller 25 determines that the rotational velocity $\omega$ has reached the brake starting rotational velocity $\omega s$, the processing proceeds from step S4 to step S5. In step S5, the spool controller 25 turns on the braking flag BF. Then, the processing proceeds from step S5 to step S6.

In step S6, the spool controller 25 outputs the aforementioned duty cycle D to the switch element 48, and performs the on/off control of the switch element 48 based on the outputted duty cycle D. Then, the processing proceeds from step S6 to step S7. While outputting the duty cycle D from the spool controller 25 to the switch element 48, the voltage of the control signal with the duty cycle D is increased by the voltage booster circuit 41. Therefore, even when the rotational velocity $\omega$ of the spool 12 decreases in the latter phase of a casting, a control signal with a stable duty cycle D can be sent to the switch element 48. On the other hand, in step S3, when the spool controller 25 determines that the braking flag BF has been already turned on, the processing proceeds to step S6.

In step S7, the spool controller 25 calculates the deceleration $-\omega a$, which is a negative rotational acceleration, based on the calculated rotational velocity $\omega$. Then, the processing proceeds from step S7 to step S8. In step S8, the spool controller 25 determines whether or not the deceleration $-\omega a$ is greater than or equal to a predetermined deceleration $-\omega a1$. This determination is based on the magnitude of the absolute value of the deceleration. When the spool controller 25 determines that the deceleration $-\omega a$ is greater than or equal to the predetermined deceleration $-\omega a1$, the processing proceeds from step S8 to step S9. In step S9, the spool controller 25 outputs the maximum braking force Dmax (e.g., a duty of 100%) obtainable at this point of time to the switch element 48 through the braking force setter 29. Then, the processing proceeds from step S9 to step S10. The voltage of the control signal with the duty cycle D is also increased. In step S8, when the spool controller 25 determines that the deceleration $-\omega a$ is less than the predetermined deceleration $-\omega a1$, the processing proceeds from step S8 to step S10.

In step S10, the spool controller 25 determines whether or not the rotational velocity ω of the spool 12 has decreased to be less than or equal to a water landing determining rotational velocity ωe. The water landing determining rotational velocity ωe is used to determine a water landing of a terminal tackle. The water landing determining rotational velocity ωe is, for instance, 2300 rpm. When the spool controller 25 determines that the rotational velocity ω has not decreased to be less than or equal to the water landing determining rotational velocity ωe yet, the processing proceeds from step S10 to step S2. Contrarily, when the spool controller 25 determines that the rotational velocity ω has decreased to be less than or equal to the water landing determining rotational velocity ωe, the processing proceeds from step S10 to step S11. In step S11, the spool controller 25 stops outputting the duty cycle D. Then, the processing proceeds from step S11 to step S12. In step S12, the spool controller 25 turns off the braking flag BF. Then, the processing proceeds from step S12 to step S2. Subsequently, when the voltage of the output from the electric storage element 51 becomes lower than the reset voltage of the spool controller 25, the spool controller 25 is reset and ends the brake control. When electric power is supplied to the spool controller 25 from the spool brake 22 during a subsequent casting, the spool controller 25 is restarted and performs the brake control until the output voltage of the electric storage element 51 reaches the reset voltage.

Here, the control signal with the duty cycle D is output by the spool controller 25, is a control signal in the brake control, and is constantly increased in voltage. With this configuration, in a fishing reel that the electric component 18 (e.g., the switch element 48) operates using electric power generated by the fishing reel, the electric component 18 controlled by the spool controller 25 can be prevented from operating unstably, even when the voltage of the generated electric power is low.

<Other Preferred Embodiments>

One preferred embodiment of the present disclosure has been explained above. However, the present disclosure is not limited to the above, and a variety of changes can be made without departing from the scope of the present disclosure. Especially, a plurality of embodiments and modifications described in the present specification can be arbitrarily combined on an as-needed basis.

(a) The aforementioned preferred embodiment has exemplified, as an electric power generator 14, the magnet 44 fixed to the spool shaft 16 and the plural coils 46. The plural coils 46 are disposed radially outside the magnet 44, and in opposition to the magnet 44. However, in the present disclosure, the positional arrangements of the magnet 44 and the coils 46 are not limited to this. For example, a plurality of magnets can be disposed on the outer lateral surface of one of the flanges 12c of the spool 12, and be aligned at intervals in the circumferential direction. Additionally, a plurality of coils can be mounted to the reel unit in opposition to the magnets.

Figure 10:
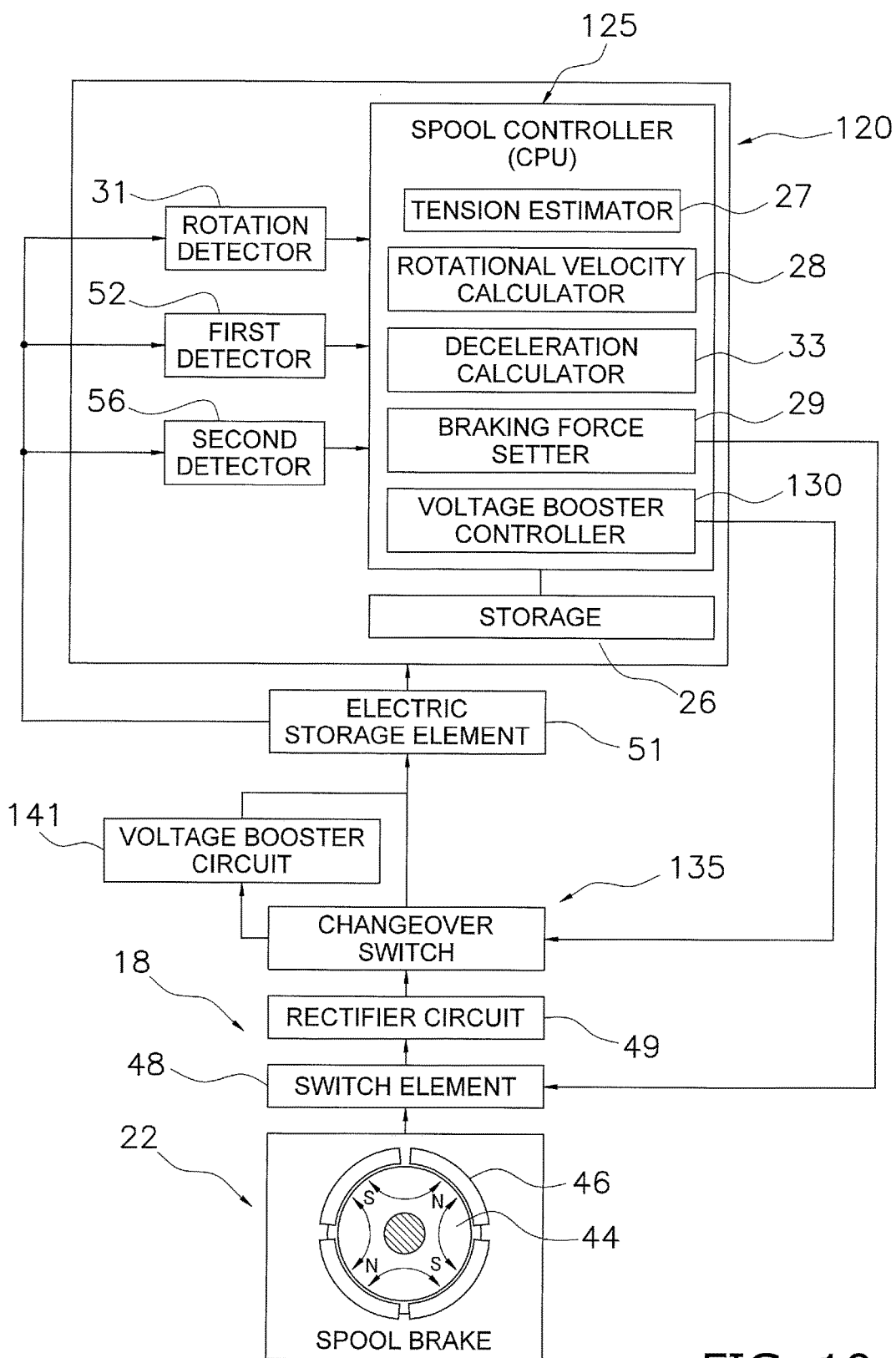
FIG. 10 is a block diagram according to another preferred embodiment and corresponds to FIG. 7.

(b) In the aforementioned preferred embodiment, a voltage of the control signal with the duty cycle D can be constantly increased by the voltage booster circuit 41 when the control signal is supplied to the switch element 48 from the spool controller 25. In this case, the electric component 18 includes the switch element 48. However, in the present disclosure, the configuration to increase the voltage of the control signal with the duty cycle D is not limited to this. For example, as shown in FIG. 10, a voltage booster circuit 141 can be disposed to increase a voltage supplied to the electric component 18 when the rotational velocity of the spool 12 becomes less than or equal to a predetermined rotational velocity (of, e.g., 3000 to 5000 rpm). According to this construction, the electric component 18 includes a spool controller 125. Thus, the spool controller 125 is another example of an electric power consuming means. For example, the voltage booster circuit 141 can be disposed between the rectifier circuit 49 and the electric storage element 51 to increase voltage supplied to the electric component 18 as described above. According to this construction, the electric component 18 includes the electric storage element 51. Thus, the electric storage element 51 is another example of an electric power consuming means. Additionally, a changeover switch 135 can be disposed between the voltage booster circuit 141 and the rectifier circuit 49. The changeover switch 135 switches between a voltage increasing action and a voltage non-increasing action of the voltage booster circuit 141. The changeover switch 135 is another example of a switching means. Switching of the changeover switch 135 is controlled by a voltage boost controller 130. The voltage boost controller 130 is a functional element implemented in the spool controller 125 by software and/or hardware. Spool brake mechanism 120 is similar to spool brake mechanism 20, with the exception of voltage booster controller 130. For example, when the rotational velocity of the spool 12 becomes less than or equal to a predetermined rotational velocity, the voltage boost controller 130 is configured to connect the rectifier circuit 49 to the voltage booster circuit 141. With this configuration, the voltage of the electric power is increased through the voltage booster circuit 141, and is stored in the electric storage element 51. Contrarily, when the rotational velocity of the spool 12 becomes greater than the predetermined rotational velocity, the voltage boost controller 130 is configured to connect the rectifier circuit 49 to the electric storage element 51. Obviously, the changeover switch 135 might not be provided in this positional arrangement, and the voltage supplied to the electric component 18 can be constantly increased regardless of the rotational velocity of the spool 12.

(c) In the aforementioned preferred embodiment, the dual-bearing reel 100 of a manual winding type has been disclosed as the fishing reel of the present disclosure. However, the fishing reel of the present disclosure is not limited to this. The fishing reel can be an electric single-bearing reel or an electric dual-bearing reel. Additionally, when the fishing reel is a dual-bearing reel, the present disclosure can be applied to a drag mechanism. The drag mechanism is another example of a generating means.

<Features>

The Aforementioned Preferred Embodiment can be Expressed as Follows (A) The dual-bearing reel 100 can forwardly release a fishing line. The dual-bearing reel 100 includes the reel unit 1, the spool 12, the spool brake 22, the spool controller 25 and the voltage booster circuit 41. The spool 12 is supported by the reel unit 1 and is rotatable in the fishing line winding direction and the fishing line releasing direction. The spool brake 22 generates an electric power, and brakes the spool 12 with the electric power when the spool 12 is rotated at least in the fishing line releasing direction. The spool controller 25 controls a braking force of the spool brake 22. The electric component 18 operates with the electric power generated by the spool brake 22. The voltage booster circuit 41 is configured to increase a voltage supplied to the electric component 18.

The dual-bearing reel 100 causes the voltage booster circuit 41 to increase the voltage supplied to the electric component 18. With this configuration, the electric component 18 can be prevented from operating in an unstable manner even when the voltage of the generated electric power is low.

(B) The voltage booster circuit 41 can increase the voltage of a control signal to be outputted from the spool controller 25. According to this configuration, a voltage of the control signal, which is liable to be affected by reduction in voltage and greatly affects a control action per se, is increased. Hence, the electric component 18 can be prevented from operating in an unstable manner, and furthermore, the control action per se, affected by the control signal, can be prevented from being performed in an unstable manner.

(C) The spool brake 22 can include the magnet 44 and the plurality of coils 46. The magnet 44 can be coupled to the spool 12 in a unitarily rotatable state, and can have a plurality of magnetic poles aligned in the circumferential direction. The plurality of coils 46 can be disposed on the outer peripheral side of the magnet 44, and be aligned in the rotational direction of the spool 12. According to this construction, electric power can be easily generated by the rotation of the spool 12.

(D) The dual-bearing reel 100 can further include the rotation detector 31, the rotational velocity calculator 28 and the deceleration calculator 33. The rotation detector 31 detects the rotation of the spool 12. The rotational velocity calculator 28 calculates the rotational velocity $\omega$ of the spool 12 based on an output from the rotation detector 31. The deceleration calculator 33 calculates the deceleration $-\omega a$ of the spool 12 based on the rotational velocity $\omega$ calculated by the rotational velocity calculator 28. When the deceleration $-\omega a$ calculated by the deceleration calculator 33 is greater than or equal to the predetermined deceleration $-\omega a1$, the spool brake 22 brakes the spool 12 with the maximum braking force Dmax, which is the braking force having the maximum magnitude obtainable at a point of time of the calculation of the deceleration $-\omega a$ by the deceleration calculator 33. According to this configuration, when the rotation of the spool 12 acutely slows down, the spool 12 is braked with a maximum braking force (e.g., a duty of 100%) obtainable at that point of time. Hence, even when the rotational velocity $\omega$ of the spool 12 acutely decelerates, backlash is unlikely to occur.

(E) The dual-bearing reel 100 can further include the electric storage element 51 to store the electric power generated by the spool brake 22. According to this construction, electric power can be stored in the electric storage element 51. Hence, even when the spool brake 22 stops generating electric power, the control action can continue to be performed until the electric storage element 51 becomes incapable of supplying electric power.

What is claimed is:

1. A fishing reel configured to forwardly release a fishing line, the fishing reel comprising:
    a reel unit;
    a spool rotatably supported by the reel unit;
    a spool brake configured to generate an electric power upon a rotation of the spool, and to apply a brake force to brake the spool using the electric power when the spool is rotated;
    an electric component configured to operate using the electric power generated by the spool brake; and
    a voltage booster circuit configured to increase a voltage supplied to the electric component.

2. The fishing reel according to claim 1, wherein the voltage booster circuit is configured to increase a voltage of a control signal output by a spool controller.

3. The fishing reel according to claim 1, wherein the spool brake includes
    a magnet coupled to the spool in a unitarily rotatable state, the magnet having a plurality of magnetic poles aligned in a circumferential direction, and
    a plurality of coils disposed on an outer peripheral side of the magnet, the plurality of coils aligned in a rotational direction of the spool.

4. The fishing reel according to claim 1, wherein the spool brake includes
    a magnet coupled to the spool in a unitarily rotatable state, the magnet having a plurality of magnetic poles aligned in a circumferential direction, and
    a plurality of coils disposed on an inner peripheral side of the magnet, the plurality of coils aligned in a rotational direction of the spool.

5. The fishing reel according to claim 1, further comprising:
    a rotation detector configured to detect a rotation of the spool; and
    a spool controller configured
        to calculate a rotational velocity of the spool based on an output from the rotation detector, and
        to calculate a deceleration of the spool based on the rotational velocity, and
        to brake the spool using a maximum magnitude of the brake force upon a determination that the deceleration of the spool is greater than or equal to a predetermined value, the maximum magnitude of the brake force obtainable at a point of time at which the determination that the deceleration of the spool is greater than or equal to the predetermined value is made.

6. The fishing reel according to claim 1, further comprising:
    an electric storage element configured to store the electric power generated by the spool brake.

7. The fishing reel according to claim 1, wherein the spool is rotatable in a fishing line winding direction and a fishing line releasing direction, and
    the spool brake is further configured to generate the electric power and to brake the spool upon a rotation of the spool in the fishing line releasing direction.

8. The fishing reel according to claim 7, wherein the spool brake is further configured to generate the electric power upon a rotation of the spool in the fishing line winding direction.

9. A fishing reel comprising:
    a reel unit;
    a spool rotatably supported by the reel unit;
    a generator including a magnet and a plurality of coils, the magnet coupled to the spool, the generator configured to generate an electric power upon a rotation of the spool;
    an electric component that operates using the electric power generated by the generator; and
    a voltage booster circuit that increases a voltage supplied to the electric component.

10. The fishing reel according to claim 9, further comprising:
    a spool brake including the generator, the spool brake configured to apply a brake force to brake the spool using the electric power generated by the generator.

11. The fishing reel according to claim 10, further comprising:
    a rotation detector configured to detect a rotation of the spool, wherein the electric component includes a spool controller configured
- to calculate a rotational velocity of the spool based on an output from the rotation detector,
- to calculate a deceleration of the spool based on the rotational velocity, and
- to brake the spool using a maximum magnitude of the brake force upon a determination that the deceleration of the spool is greater than or equal to a predetermined value, the maximum magnitude of the brake force obtained at a point of time at which the determination that the deceleration of the spool is greater than or equal to the predetermined value is made.

12. The fishing reel according to claim 10, wherein the spool is rotatable in a fishing line winding direction and a fishing line releasing direction, and
the spool brake is further configured to generate the electric power and to brake the spool upon a rotation of the spool in the fishing line releasing direction.

13. The fishing reel according to claim 12, wherein the spool brake is further configured to generate the electric power upon a rotation of the spool in the fishing line winding direction.

14. The fishing reel according to claim 9, wherein the voltage booster circuit is configured to increase a voltage of a control signal, and
the electric component is a switch element that receives the control signal having the increased voltage.

15. The fishing reel according to claim 9, wherein the voltage booster circuit increases a voltage of the electric power supplied by the generator to an electric storage element that stores the electric power, and
the electric component is the electric storage element that stores the electric power generated by the generator.

16. The fishing reel according to claim 9, wherein the magnet of the generator is coupled to the spool in a unitarily rotatable state, the magnet having a plurality of magnetic poles aligned in a circumferential direction about a rotational axis of the spool, and
the plurality of coils of the generator are disposed on an outer peripheral side of the magnet, the plurality of coils aligned in a rotational direction of the spool.

17. The fishing reel according to claim 9, wherein the magnet of the generator is coupled to the spool in a unitarily rotatable state, the magnet having a plurality of magnetic poles aligned in a circumferential direction about a rotational axis of the spool, and
the plurality of coils of the generator are disposed on an inner peripheral side of the magnet, the plurality of coils aligned in a rotational direction of the spool.

18. A fishing reel configured to forwardly release a fishing line, the fishing reel comprising:
a reel unit;
a spool rotatably supported by the reel unit;
generating means for generating an electric power upon a rotation of the spool;
electric power consuming means for consuming the electric power generated by the generating means; and
a voltage booster circuit that increases a voltage supplied to the electric power consuming means.

19. The fishing reel according to claim 18, further comprising:
switching means for switching the electric power generated by the generating means.

20. The fishing reel according to claim 19, wherein the electric power consuming means includes control means for controlling the generating means and the switching means.

* * * * *